(12) United States Patent
Szczupak et al.

(10) Patent No.: US 12,304,573 B2
(45) Date of Patent: May 20, 2025

(54) SPARE WHEEL CONTAINERS FOR A VEHICLE

(71) Applicant: RIVIAN IP HOLDINGS, LLC, Irvine, CA (US)

(72) Inventors: Jonathan Szczupak, Orange, CA (US); Jonathan David Salerno, Newport, CA (US); Aaron Weast, Trabuco Canyon, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 17/852,089

(22) Filed: Jun. 28, 2022

(65) Prior Publication Data

US 2023/0415827 A1    Dec. 28, 2023

(51) Int. Cl.
*B62D 43/02* (2006.01)
*B60R 9/06* (2006.01)

(52) U.S. Cl.
CPC .............. *B62D 43/02* (2013.01); *B60R 9/065* (2013.01)

(58) Field of Classification Search
CPC ........ B62D 43/02; B62D 43/04; B60R 9/065; B60R 11/06; B60D 1/62
See application file for complete search history.

(56) References Cited

U.S. PATENT DOCUMENTS

| | | | | |
|---|---|---|---|---|
| 1,008,680 A * | 11/1911 | Temple | .................. | B62D 43/02 224/42.14 |
| 1,724,281 A * | 8/1929 | Hathorn | ................ | G09F 21/045 40/587 |
| 4,498,614 A * | 2/1985 | Guarr | ...................... | B60R 11/06 224/42.13 |
| 4,738,463 A * | 4/1988 | Poore | ...................... | B60D 1/62 280/421 |
| 4,830,241 A * | 5/1989 | Ulmer | .................... | B62D 43/10 296/37.2 |
| 5,038,983 A * | 8/1991 | Tomososki | .............. | B60R 9/065 224/527 |
| 5,118,017 A * | 6/1992 | Buck | ...................... | B62D 43/02 224/42.13 |
| 5,429,285 A * | 7/1995 | Kim | ........................ | B60R 11/06 206/573 |
| 5,941,432 A * | 8/1999 | Spencer | ................. | B62D 43/10 141/2 |
| 6,264,016 B1 * | 7/2001 | Bales | ..................... | H02G 11/02 191/12.4 |

(Continued)

*Primary Examiner* — Justin M Larson

(74) *Attorney, Agent, or Firm* — Haley Guiliano LLP

(57) ABSTRACT

A vehicle includes a system for storing containers in a cavity of a spare wheel at an exterior of the vehicle. The system includes a dock having a bracket secures the wheel to the exterior surface of a vehicle with an outer face of the wheel facing inwards toward the vehicle and the cavity of the wheel facing outwards away from the vehicle. The container is arranged in the cavity of the wheel. The container and dock may include one or more electrical connectors or ports, fluid ports, communications ports, or a combination thereof. The container may include a first aid kit, waste can, water container, cooler, auxiliary battery, vacuum cannister, compressed air system, toolbox, storage space, electric appliance, electric cord wound on a reel, a camera, or other types of containers. The container may be secured to the wheel, to the dock, or to both.

18 Claims, 8 Drawing Sheets

(56) References Cited

U.S. PATENT DOCUMENTS

| | | | | |
|---|---|---|---|---|
| 6,854,543 B2* | 2/2005 | Rowley | ............... | B60R 16/04 |
| | | | | 206/703 |
| 7,036,697 B2* | 5/2006 | Hwang | ............... | B60R 11/06 |
| | | | | 206/373 |
| 7,611,185 B2* | 11/2009 | Allen | ............... | B60R 11/06 |
| | | | | 280/830 |
| 7,762,601 B2* | 7/2010 | Shea | ............... | B60R 11/06 |
| | | | | 296/37.16 |
| 8,561,737 B2* | 10/2013 | Ichikawa | ............... | B60L 53/18 |
| | | | | 180/65.21 |
| 8,690,033 B2* | 4/2014 | Harriton | ............... | B62D 43/02 |
| | | | | 224/42.13 |
| 8,955,725 B2* | 2/2015 | Turner | ............... | B60R 9/06 |
| | | | | 224/511 |
| 9,616,820 B2* | 4/2017 | Raley | ............... | B60R 9/065 |
| 9,707,904 B2* | 7/2017 | Francis | ............... | B60R 11/06 |
| 9,738,125 B1* | 8/2017 | Brickley | ............... | B60D 1/62 |
| 9,802,659 B2* | 10/2017 | Anderson | ............... | B62D 43/02 |
| 10,150,520 B1* | 12/2018 | Jalpa | ............... | B62D 43/10 |
| 10,479,427 B2* | 11/2019 | Scaringe | ............... | B60K 1/04 |
| 10,629,016 B1* | 4/2020 | Helm | ............... | B60R 9/065 |
| 10,773,645 B2* | 9/2020 | Helm | ............... | B60Q 9/00 |
| 10,800,341 B2* | 10/2020 | Merryman | ............... | B60R 9/065 |
| 10,870,453 B2* | 12/2020 | Elder | ............... | B60R 9/052 |
| 11,130,444 B2* | 9/2021 | Oh | ............... | B60L 1/16 |
| 11,414,928 B2* | 8/2022 | Allan | ............... | B65D 25/02 |
| 2012/0262115 A1* | 10/2012 | Ichikawa | ............... | B60L 58/40 |
| | | | | 320/109 |
| 2021/0387571 A1* | 12/2021 | Oh | ............... | B60L 1/16 |

* cited by examiner

SPARE WHEEL CONTAINERS FOR A VEHICLE

INTRODUCTION

The present disclosure is directed to a spare wheel container for a vehicle and, more particularly, to a container for installing in a cavity of a wheel facing away from the vehicle.

SUMMARY

The present disclosure is directed to a system for storage in a vehicle. The system includes a dock configured to secure a wheel to an exterior surface of a vehicle with an outer face of the wheel facing inwards toward the vehicle and a cavity of the wheel facing outwards away from the vehicle. The system also includes one or more containers configured to be arranged in the cavity of the wheel. For example, the container has an outer diameter, the cavity has an inner diameter, and the outer diameter is less than the inner diameter such that the container fits within the cavity. In some embodiments, the container is cylindrical or approximately cylindrical, and fits within an approximately cylindrical cavity of the wheel.

In some embodiments, the container includes an electrical connector, and the dock includes a mating electrical connector configured to interface to the electrical connector when the container is arranged in the cavity of the wheel. For example, in some embodiments, the container includes an auxiliary battery coupled to the electrical connector. In some embodiments, the container includes a fluid system (e.g., a vacuum, liquid, or pressurized gas system) coupled to the electrical connector. For example, in some embodiments, the container includes a vacuum cannister and a vacuum pump coupled to the electrical connector. In a further example, in some embodiments, the container includes a compressed air system coupled to the electrical connector. In a further example, in some embodiments, the container includes an electric cord wound on a reel, and wherein the electric cord is coupled to the electrical connector. In a further example, in some embodiments, the container includes an electric appliance. In some embodiments, the container includes control circuitry configured to provide at least one of electrical power to the container or a control signal to the container. For example, the container may include a connector having one or more electrical terminals (e.g., the frame may be electrically grounded) configured to transfer electrical power between the container and the vehicle, communications signals between the container and the vehicle, or a combination thereof. In some embodiments, the container includes at least one communications port configured to communicate with control circuitry of the vehicle.

In some embodiments, the container includes at least one fluid port and the dock includes at least one mating fluid port configured to interface to the at least one fluid port when the container is arranged in the cavity of the wheel such that a fluid may transfer between the at least one fluid port and the at least one mating fluid port. For example, the fluid ports may include connectors or fittings configured to transfer air, water, coolant, lubricant, or any other suitable fluid at any suitable conditions between the vehicle and the container.

In some embodiments, the container includes a storage space such as, for example, a first aid kit, a waste can, a water container, an appliance (e.g., an electric appliance), or a toolbox. In some embodiments, the container includes a cooler, and the container is thermally insulated. In some embodiments, the cooler is cooled using a thermoelectric cooler or a refrigeration cycle of the container, which is powered via an electrical connector of the container.

In some embodiments, the container includes an identifier tag such as, for example, a radio-frequency identification tag or memory configured to store container information. In some embodiments, the vehicle includes control circuitry configured to identify the identifier tag and determine information about the container based on the identifier tag. For example, in some embodiments, the control circuitry determines a type of container, a state of the container, or a functionality of the container. In some embodiments, the container includes a port configured to interface with a user device and accessible when the container is arranged in the cavity. For example, in some embodiments, the container includes a USB port or other suitable port for charging or powering a user device (e.g., a mobile phone, computer, light, radio). In a further example, the container may include a battery configured to provide electrical power to an external device via an electrical port. In some embodiments, the control circuitry is further configured to communicate with the container, and the information about the container includes a filled level of the container (e.g., level of solids or items, liquid level, or other suitable indicator of level). In some embodiments, the system or vehicle includes control circuitry configured to display the information about the container on a display of a vehicle.

In some embodiments, the present disclosure is directed to a container for a vehicle. The container includes an outer surface configured to fit within a cavity of a spare wheel of the vehicle and a mounting area configured to engage with a bracket configured to secure the spare wheel at a rear of the vehicle. In some embodiments, the container includes at least one port configured to interface with a mating port of a vehicle. The at least one port may include an electrical port, a fluid port, a communications port, or a combination thereof. For example, in some embodiments, the at least one port includes a communications port configured to receive a signal from the vehicle. In a further example, in some embodiments, the at least one port includes an electrical port configured to exchange electrical power with the vehicle.

In some embodiments, the present disclosure is directed to a method of vehicle storage. The method includes securing a spare wheel to a bracket arranged at a rear of the vehicle. The outer face of the wheel is arranged facing inwards toward the vehicle and a cavity of the wheel is arranged facing outwards away from the vehicle. The method also includes installing a container into the cavity of the spare wheel such that the container is accessible from the rear of the vehicle when the spare wheel is secured to the bracket. In some embodiments, the method includes coupling at least one port of the container to at least one mating port of the dock. The at least one port may include an electrical port, a fluid port, a communications port, or a combination thereof. For example, installing the container in the cavity may include arranging the container in the cavity and coupling the ports, which may occur simultaneously or sequentially. In some embodiments, the container includes an identifier tag, and the method includes identifying, using control circuitry, the identifier tag, and determining information about the container based on the identifier tag.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION OF THE DRAWINGS

Vehicles may be configured with a spare wheel mounted to a dock (e.g., a bracket) on the exterior of the vehicle. The spare wheel includes an outer side that faces away from the vehicle when the wheel is installed as a driving wheel, and an inner side having a cavity. By mounting the wheel with the cavity of the inner side facing away from vehicle, the cavity may be used for convenient storage. In some embodiments, the dock includes one or more brackets that may accommodate mounting both the wheel and a container that fits within the cavity of the wheel. For example, in some embodiments, the one or more brackets are configured to hold both the wheel and the container, which may attach to the bracket, the wheel, or both. The one or more brackets may include frame features to hold the wheel in place. In some embodiments, the vehicle may include an automated lift feature, for lifting the wheel into place using an electric motor and lifting mechanism. The vehicle (e.g., a dock thereof for mounting a wheel) may include one or more container interfaces, configured to support one or more types of containers. For example, containers may have subsystems such as a heating/ventilation/air-conditioning (HVAC) system, electrical systems, data interface system (wired or wireless), water storage or conditioning (e.g., a shower system), air compressor system, refrigerator system, battery system, vacuum system, or any other suitable system. In some embodiments, the container may include a storage space such as a cooler, water tank, first aid kit, toolbox, waste can, or other suitable storage space. To illustrate, the container may include a compressed air system that may be used to provide air pressure to the spare wheel, or to pressurize a cannister to function as shower. A wheel or spare wheel, as referred to herein, may refer to a full-size spare, a donut-type spare, a combination of a tire and rim, or any other suitable spare wheel (e.g., not installed at a drive axis but rather for storage). In some embodiments, the present disclosure also applies to rims of wheel (e.g., a metal rim or other suitable frame without an installed tire), which may be mounted to a vehicle and into which a container may be mounted.

Figure 1:
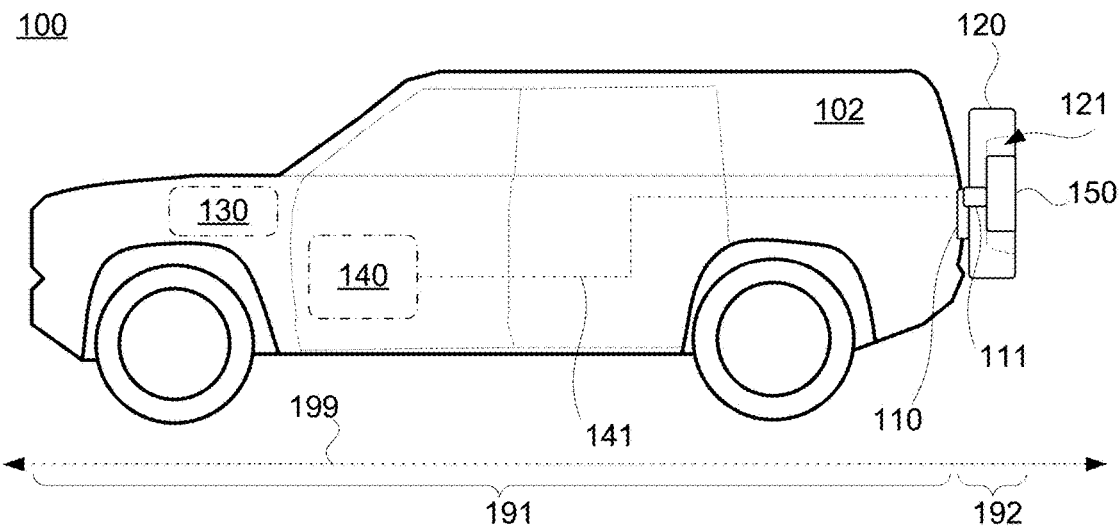
FIG. 1 shows a side view of an illustrative vehicle having a spare wheel container, in accordance with some embodiments of the present disclosure.

FIG. 1 shows a side view of illustrative vehicle 100 having a spare wheel container 150, in accordance with some embodiments of the present disclosure. Vehicle 100 is illustrated as a sport utility vehicle (SUV) in FIG. 1, but the systems of the present disclosure may be applied to any suitable vehicle such as, for example, an electric vehicle, a sedan, a coupe, a truck, a crossover, a station wagon, a van, a truck having more than two axles, or any other suitable vehicle. As illustrated, vehicle 100 includes compartment 102, controller 130 (e.g., including control circuitry), subsystem 140, dock 110, spare wheel 120, and container 150 (e.g., illustrated as a rear mounted wheel and container). Although compartment 102 is illustrated as an occupant compartment, compartment 102 may include a truck bed, or any other suitable compartment, in accordance with the present disclosure.

As illustrated, spare wheel 120 is arranged at the rear (e.g., along longitudinal axis 199) of vehicle 100 when stowed at dock 110. It will be understood that the spare wheel containers of the present disclosure may be arranged at any suitable exterior portion of a vehicle (e.g., rear, front, side, beneath). For example, spare wheel 120 and container 150 are arranged longitudinally rearward (e.g., in region 192) of the rest of vehicle 100 (e.g., corresponding to region 191). In an illustrative example, container 150 may be configured to store equipment (e.g., sporting gear, tools, etc.), materials (e.g., water), tools (e.g., a vacuum, extension cord, waste bin, air compressor), accessories or appliances (e.g., an electric grill, a refrigerator), subsystems (e.g., battery systems, fluid systems, electrical systems, or any other suitable systems), or any other suitable items. Container 150 is arranged in cavity 121 of spare wheel 120 (e.g., which may be a full-size spare, or otherwise any suitable wheel stowed at dock 110), which is arranged facing outward of vehicle 100. For example, because spare wheel 120 is arranged backwards when stowed (e.g., with the face of the wheel facing inward toward vehicle 100), cavity 121 (e.g., at the inside of spare wheel 120 when installed as a driving wheel) faces outward a user may access container 150 from outside vehicle 100 (e.g., from the rear as illustrated).

In an illustrative example, a user may install spare wheel 120 on a bracket of dock 110 and secure spare wheel 120 using fastener 111. The user may then place container 150 in cavity 121 of spare wheel 120 because cavity 121 faces outward when spare wheel 120 is secured to dock 110. In some embodiments, container 150 may be secured to dock 110 (e.g., a bracket or fastener 111 thereof). In some embodiments, container 150 may be secured to spare wheel 120 using a fastener (e.g., a lug, stud, nut), clip, clamp, any other component or feature, or any combination thereof for affixing container 150. In some embodiments, for example, container 150 may be secured to both dock 110 and spare wheel 120 when installed (e.g., during driving or otherwise a stowed configuration).

Dock 110 may include a bracket, a hub, a tray, or other suitable component to which spare wheel 120 may be secured. Fastener 111, which may be part of dock 110, may include a threaded nut, a screw or bolt, a clip, or other suitable component for affixing to dock 110 or a bracket, hub, tray, or otherwise component thereof. To illustrate, dock 110 may include a hub having one or more studs protruding outward onto which spare wheel 120 may be set and then secured with lugs. In another example, dock 110 may include a tray or support onto which spare wheel 120 may be set, and then secured with a strap, clip, or other suitable component. In a further example, dock 110 may include a curved tray (e.g., shaped as a semi-circle or sector) into which spare wheel 120 may be set and then secured with a fastener, strap, clip, or other suitable component.

Dock 110 may include an interface for interfacing to container 150. For example, dock 110 may include a hub, bracket, or tray to which both spare wheel 120 and container 150 may be secured. In a further example, container 150 may include an outer diameter, cavity 121 includes an inner diameter, and the outer diameter is less than the inner diameter such that container 150 fits within cavity 121. In a further example, container 150 may include a thickness or depth that less than, greater than, or equal to the depth of the wheel cavity.

In an illustrative example, vehicle 100 includes a system for storage. The system includes dock 110 that is configured to secure a wheel (e.g., spare wheel 120) to an exterior surface (e.g., region 192, as illustrated) of vehicle 100 with an outer face of the wheel (e.g., spare wheel 120) facing inwards toward vehicle 100 and the inside of the wheel (e.g., cavity 121) facing outwards away from vehicle 100. The system may also include one or more containers (e.g., of which, container 150 is one) that are each configured to be arranged in the cavity (e.g., cavity 121) of the wheel (e.g., spare wheel 120). To illustrate, the container (e.g., container 150) may include a first aid kit, waste can, water container, refrigerator, auxiliary battery, vacuum cannister, compressed air system, toolbox, storage space, electric appliance (e.g., an electric grill, radio, charger, coffee maker), electric cord (e.g., wound on a reel), any other suitable type of container having any suitable functionality, or any combination thereof. Coupling 141, which may include a communications link, fluid coupling and conduit, electrical coupling and conductor (e.g., cable with connectors), a sensor system, any other suitable coupling, or any combination thereof for coupling subsystem 140 to container 150, dock 110, or a combination thereof.

Figure 2:
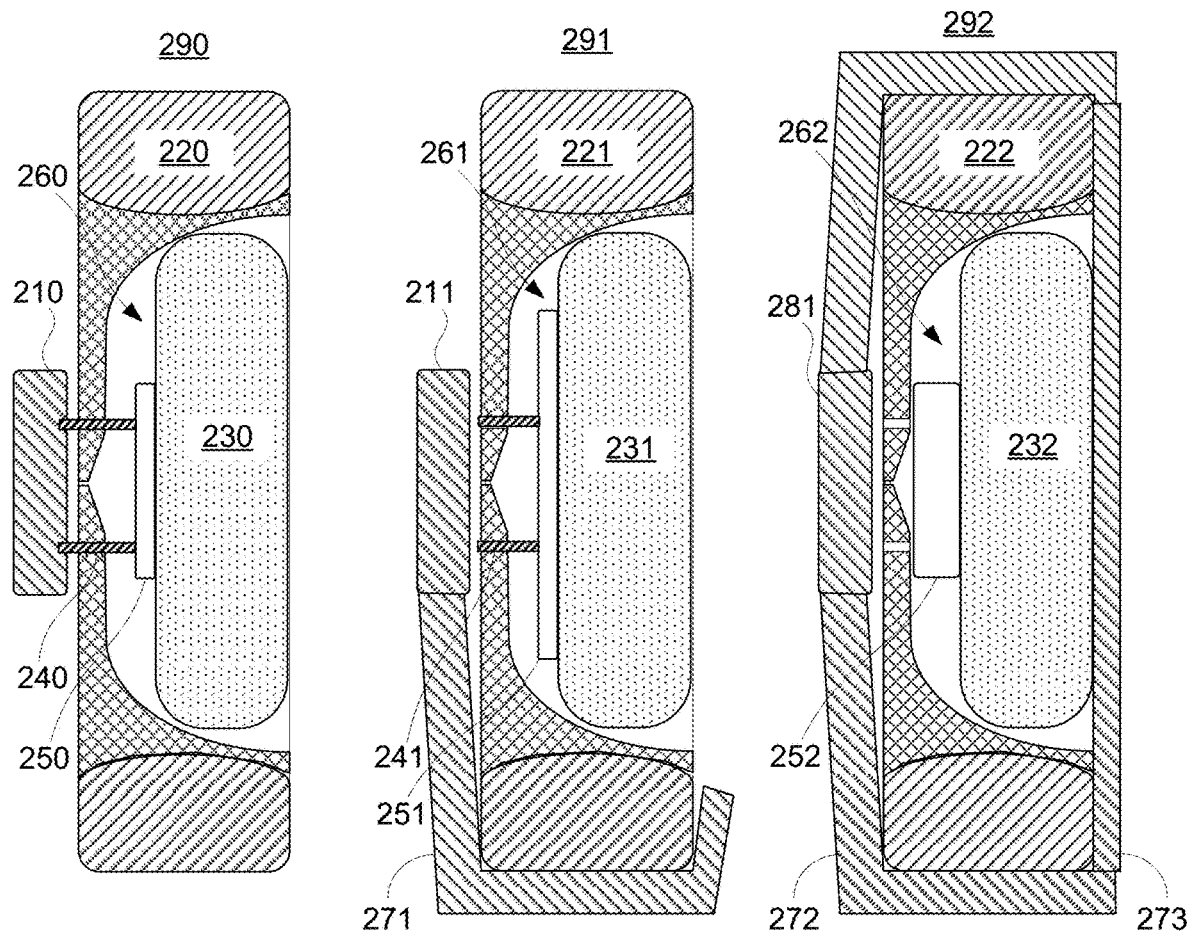
FIG. 2 shows block diagrams of illustrative spare wheel containers for a vehicle, in accordance with some embodiments of the present disclosure.

FIG. 2 shows block diagrams of illustrative spare wheel containers for a vehicle, in accordance with some embodiments of the present disclosure.

Panel 290 shows wheel 220 arranged on bracket 210 via fasteners 240. Panel 290 also illustrates container 230 arranged in cavity 260 of wheel 220. As illustrated, mount 250 is secured to fasteners 240. In some embodiments, mount 250 may be secured to fasteners 240, and container 230 may clip or otherwise affix to mount 250. In some embodiments, mount 250 may be integrated as part of container 230, which may include features, mechanisms, or both to secure container 230 to bracket 210. In an illustrative example, fasteners 240 may include threaded studs, and fasteners 240 and bracket 210 may form a hub. Wheel 220 is lifted onto the hub, and then mount 250 is secured to fasteners 240. Container 230 is then secured to mount 250. In an illustrative example, bracket 210 and fasteners 240 are an example a dock to which wheel 220 and container 230 are secured.

Panel 291 shows wheel 221 arranged on bracket 271 (e.g., a tub, as illustrated) which is affixed to, or otherwise includes, bracket 211. Bracket 271 may include any suitable shape (e.g., semi-circular, circular, sector, or any other suitable shape) for holding wheel 221. Mount 251 may be secured to wheel 221 via fasteners 241, and container 231 may be affixed to mount 251, optionally before wheel 221 is arranged on bracket 271 (e.g., wheel 221 and container 231 may be assembled before placement on bracket 271). Panel 291 illustrates container 231 arranged in cavity 261 of wheel 221. As illustrated, mount 251 is secured to wheel 221 by fasteners 241, rather than being affixed directly to bracket 211. In some embodiments, mount 251 may be secured to fasteners 241, and container 231 may clip or otherwise affix to mount 251. In some embodiments, mount 251 may be integrated as part of container 231, which may include features, mechanisms, or both to secure container 231 to wheel 221. In an illustrative example, fasteners 241 may include threaded machine screws. Wheel 221 and container 231, as a subassembly, may be lifted onto bracket 271. In an illustrative example, bracket 211, bracket 271, and fasteners 241 are an example of a dock to which wheel 221 and container 231 are secured.

Panel 292 shows wheel 222 arranged on bracket 272, which is affixed to, or otherwise includes, bracket 281. Bracket 272 may include any suitable shape (e.g., semi-circular, circular, sector, a band, or any other suitable shape) for holding wheel 222 along with bracket 273 (e.g., which may span across wheel 222). Mount 252 may be secured to wheel 222 and container 232 may be affixed to mount 252, optionally before or after wheel 222 is arranged on bracket 272 (e.g., wheel 221 and container 231 may be assembled before placement on bracket 272). Once wheel 222 is arranged on or relative to bracket 272, bracket 273 may be arranged (e.g., rotated or otherwise placed) to secure wheel 222. Panel 292 illustrates container 232 arranged in cavity 262 of wheel 222. As illustrated, mount 252 is secured to wheel 221, rather than being affixed directly to bracket 281, although bracket 273 may optionally be used to secure container 232 (e.g., mount 252 may optionally be omitted in some embodiments). In some embodiments, mount 252 may be integrated as part of container 232, which may include features, mechanisms, or both to secure container 232 to wheel 222. In some embodiments, mount 252 may be omitted or otherwise not included. Wheel 222 and container 232, as a subassembly, may be lifted onto bracket 272, with bracket 273 positioned out of the way. In an illustrative example, bracket 281, bracket 272, and bracket 273 are an example of a dock to which wheel 222 and container 232 are secured.

Figure 3:
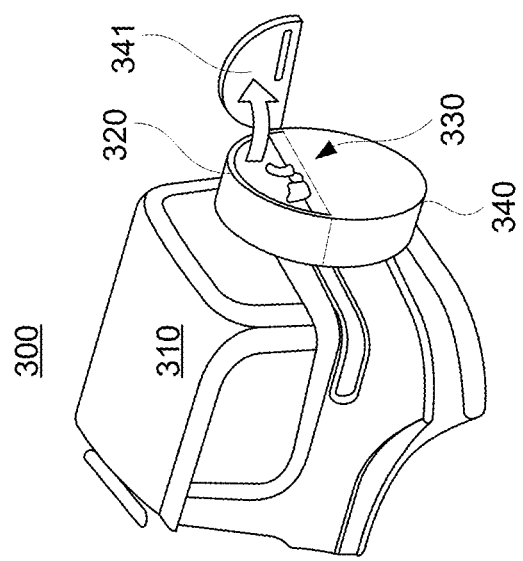
FIG. 3 shows a perspective view of an illustrative vehicle with a container installed, in accordance with some embodiments of the present disclosure.

FIG. 3 shows a perspective view of illustrative vehicle 310 with container 330 installed, in accordance with some embodiments of the present disclosure. Arrangement 300 illustrated in FIG. 3 includes element 340 configured to hold wheel 320 with container 330 arranged in a cavity of wheel 320. Element 340, as illustrated, is a tub sized such that it can hold wheel 320. Element 340 includes section 341 that can be opened and closed to access container 330 when installed. For example, section 341 may be joined to the rest of element 340 by a hinge joint or any other suitable joint (e.g., section 341 may be movable or removable). In some embodiments, Element 340 may be cylindrically shaped just larger than wheel 320 such that wheel 320 fits inside. In some embodiments, element 340 may be have a sector shape or a semi-circular cylindrical shape that corresponds to a portion of wheel 320 (e.g., a half-circular tub in which wheel 320 sits). In some embodiments, element 340 may have a cylindrical shape and include more than one section such that a section can be removed to place and remove wheel 320 (e.g., two semi-circular shaped halves).

Figure 4:
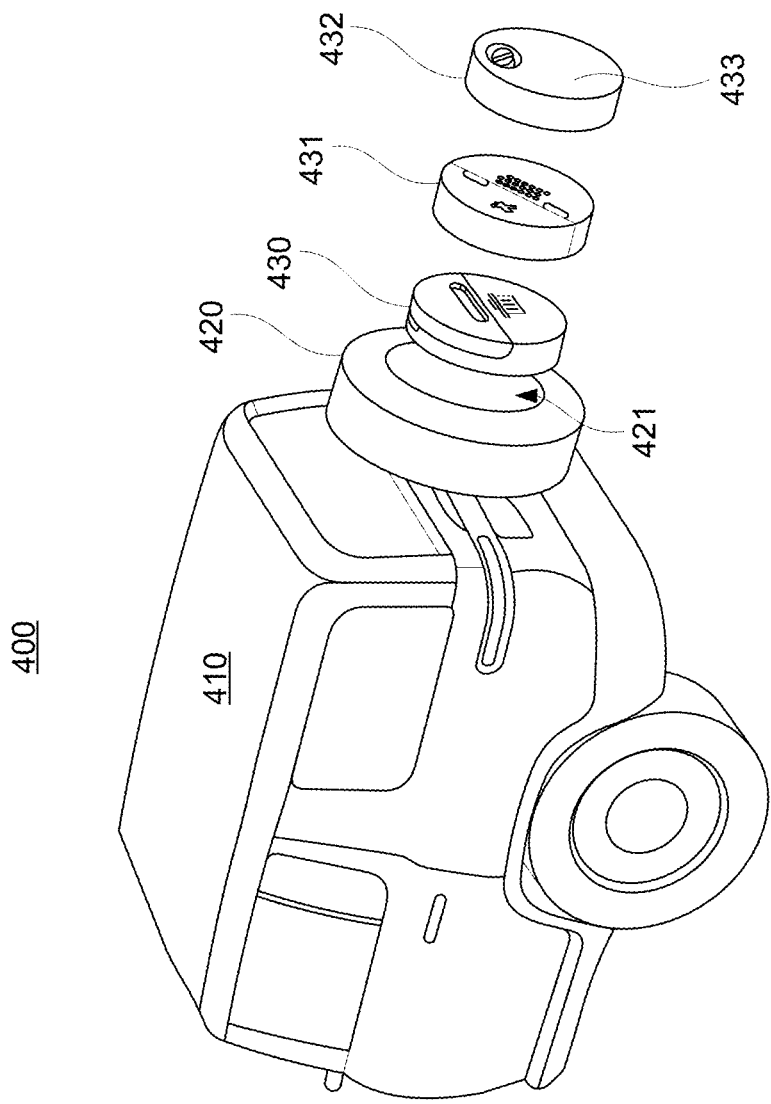
FIG. 4 shows a perspective view of an illustrative vehicle with several interchangeable containers, in accordance with some embodiments of the present disclosure.

FIG. 4 shows a perspective view of illustrative vehicle 410 with several interchangeable containers 430-432, in accordance with some embodiments of the present disclosure. As illustrated, wheel 420 is secured to the rear of vehicle 410, with cavity 421 of wheel 420 facing outward. Any of containers 430, 431, or 432 may be installed in cavity 421. Container 430 is a waste can or otherwise storage space with a fold down lid. Container 431 is a first aid kit, which may include any suitable items (e.g., scissors, bandages, gauze, antiseptic, ace wrap, etc.). Container 432 is a water canteen configure to store potable water (e.g., container 432 is a water tank). For example, a user may own several containers and store them in vehicle 410, with one stored in cavity 421. Further, each of containers 430-432 has an outer surface as indicated by outer surface 433 of container 432.

Figure 5:
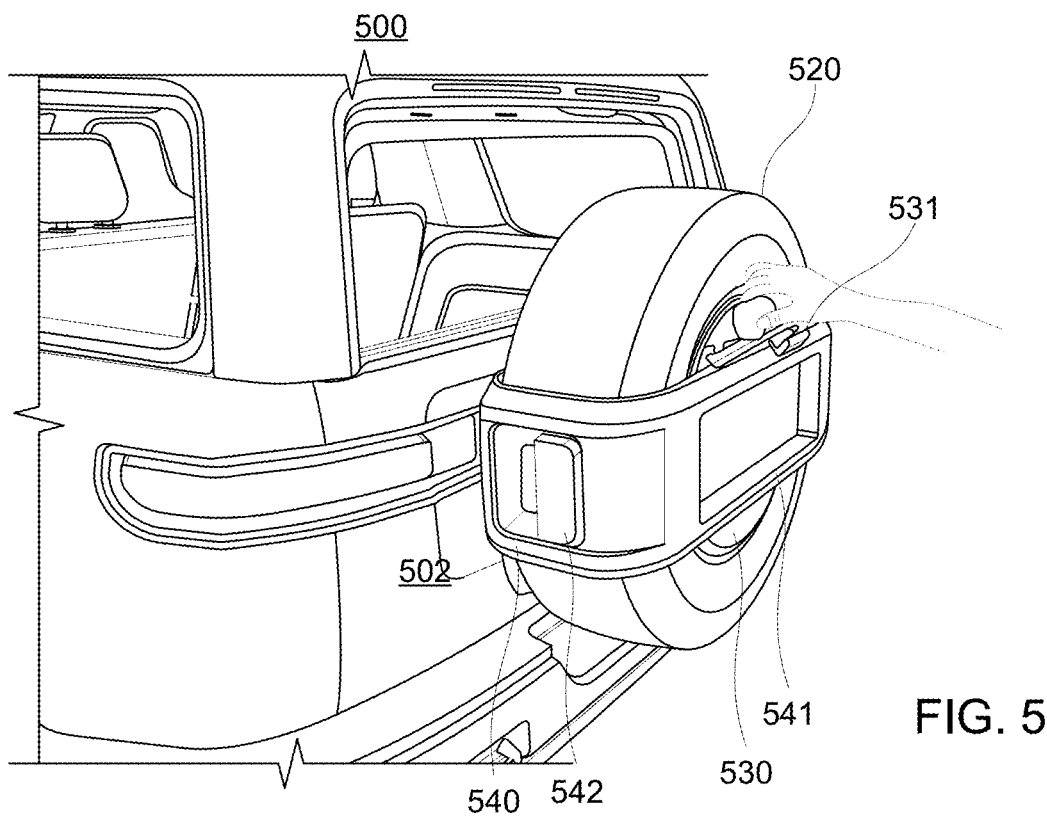
FIG. 5 shows a perspective view of an illustrative vehicle with an illustrative container for storage, in accordance with some embodiments of the present disclosure.
Figure 6:
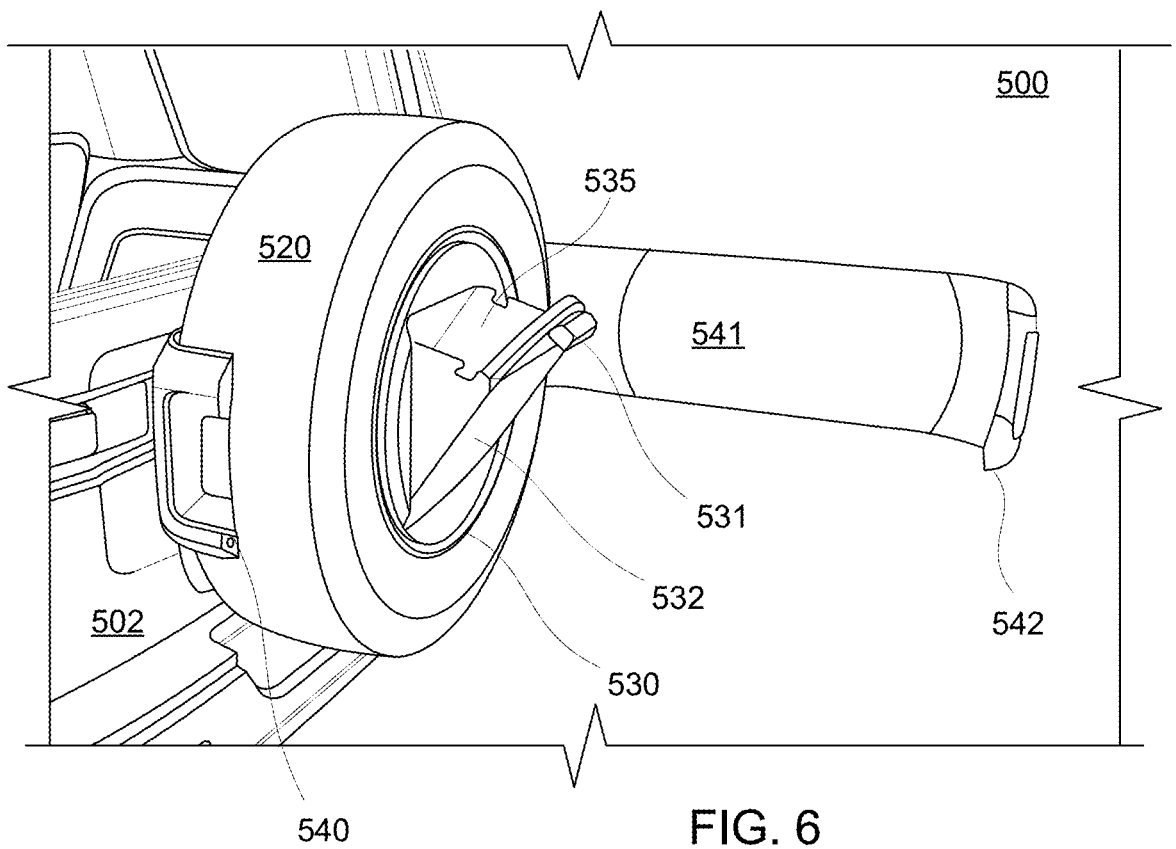
FIG. 6 shows a perspective view of the illustrative vehicle of FIG. 5, with a latch released, in accordance with some embodiments of the present disclosure.

FIG. 5 shows a perspective view of illustrative vehicle 500 with illustrative container 530 for storage, in accordance with some embodiments of the present disclosure. FIG. 6 shows a perspective view of illustrative vehicle 500 of FIG. 5, with latch 542 released, in accordance with some embodiments of the present disclosure. As illustrated, vehicle 500 includes exterior 502 (e.g., a rear hatch door, as illustrated), wheel 520 (e.g., a spare wheel), a bracket (e.g., including elements 540 and 541), latch 542, and container 530 (e.g., having access doors 531 and 532). As illustrated in FIG. 5, wheel 520 may be secured to the bracket (e.g., to elements 540 and 541, by latch 542), with latch 542 secured and element 541 arranged across wheel 520, allowing access to access door 531 of container 530. As illustrated in FIG. 6, wheel 520 may be arranged on the bracket (e.g., to element 540), with latch 542 released and element 541 swung out, allowing access to access door 532 of container 530. To illustrate, wheel 520 may be arranged against element 540 (e.g., on a hub thereof) with the inner side and cavity of the wheel facing outward, and container 530 may be arranged in the cavity of wheel 520. As illustrated, access door 532 may be rotated outward to access a storage space 535 of container 530. To fully secure wheel 520, container 530, or both, element 541 may be closed such that latch 542 may be engaged, as illustrated in FIG. 5. In a fully secured configuration, the user may have access to storage space 535 via access door 531. For example, as illustrated, container 530 may include a first aid kit, waste can, toolbox, or otherwise space for storing any suitable items. Similarly, any suitable container, having any suitable functionality, may be arranged in the cavity of wheel 520 and secured using elements 540 and/or 541, and latch 542. In an illustrative example, elements 540 and 541 may be the same as brackets 272 and 273 of panel 292 of FIG. 2.

Figure 7:
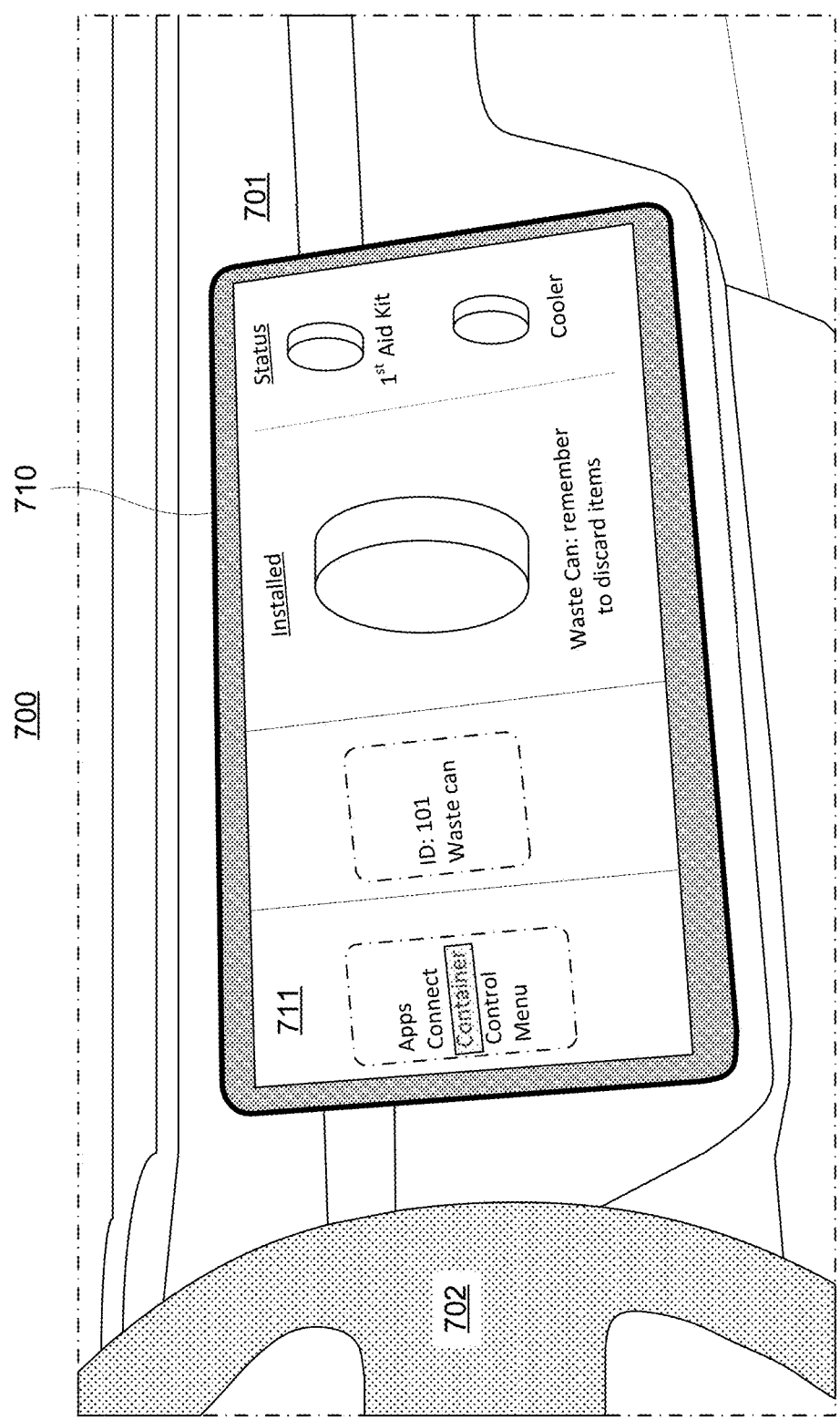
FIG. 7 shows a perspective view of an interior of a vehicle having an illustrative interface displaying container information, in accordance with some embodiments of the present disclosure.

FIG. 7 shows a perspective view of an interior of a vehicle 700 having illustrative interface 711 displaying container information, in accordance with some embodiments of the present disclosure. As illustrated, interface 711 provided by device 710, which is arranged on dash 701 of vehicle 700 (e.g., a portion of steering wheel 702 is illustrated for reference). Interface 711 may include a display and an input interface (e.g., a touchscreen, hard buttons, or a combination thereof). As illustrated, interface 711 is displaying container information including, for example, container identification for an installed container, container status, container-specific text, and identification of other containers. Interface 711 may be configured to store, process, and display any suitable container information and also to control or monitor operation of a container if the container includes a subsystem. For example, the container may include an electrical system, fluid system, communications system, or a combination thereof. In a further example, the container may include storage space, an air compressor, a vacuum pump, a water pump, a heater, a cooler (e.g., a thermoelectric cooler or refrigeration cycle), a battery, control circuitry, ports for external devices, ports for coupling to vehicle 700, any other suitable aspects or components, or any combination thereof, that may be monitored or controlled via interface 711. Further examples of container-vehicle interfaces are described in the context of FIG. 10, for example.

Figure 8:
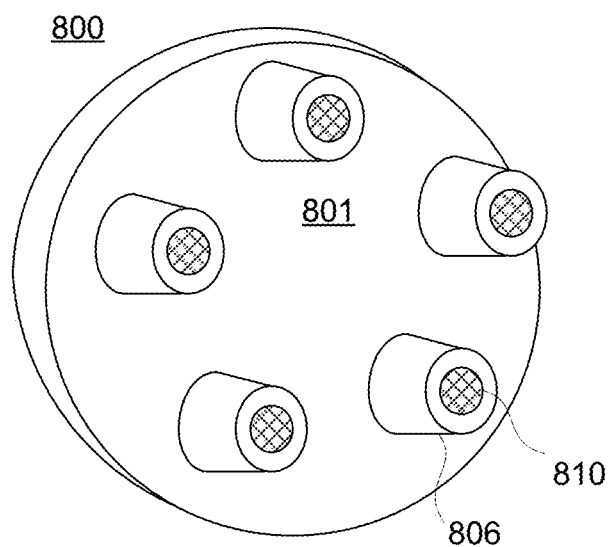
FIG. 8 shows a perspective view of an illustrative bracket, in accordance with some embodiments of the present disclosure.
Figure 9:
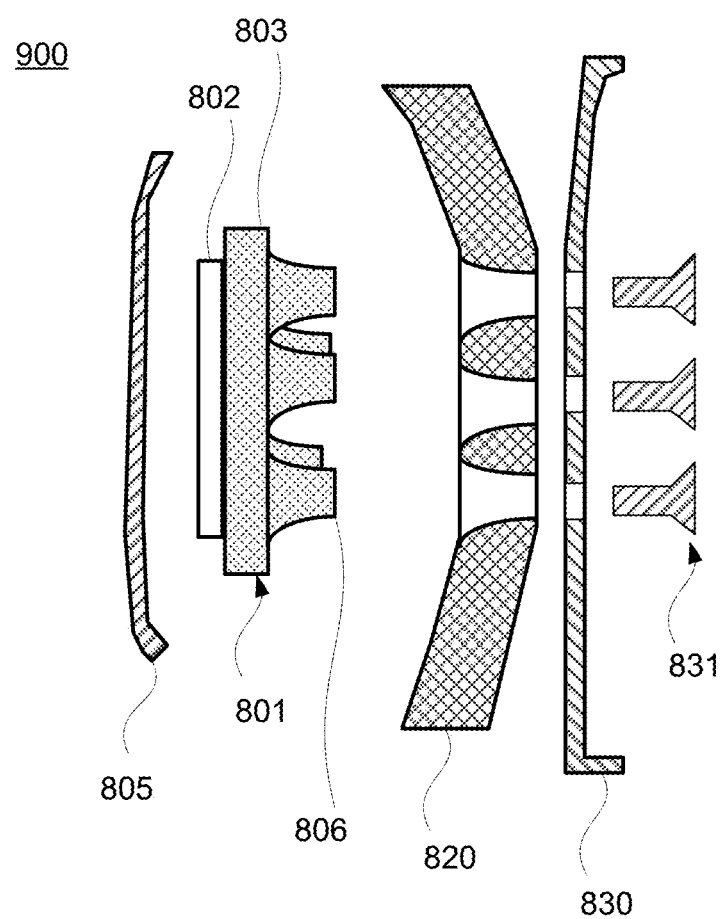
FIG. 9 shows a side view of an illustrative bracket arrangement, including the bracket of FIG. 8, in accordance with some embodiments of the present disclosure.

FIG. 8 shows a perspective view of illustrative bracket 801, in accordance with some embodiments of the present disclosure. FIG. 9 shows a side view of illustrative bracket arrangement 900, including bracket 801 of FIG. 8, in accordance with some embodiments of the present disclosure. Bracket 801 is illustrated as a hub in FIG. 8 but may include any suitable shape, components, and interface. FIG. 9 shows a side, cross-sectional, exploded view of illustrative bracket arrangement 900, including at least portions of vehicle body 805, bracket 801, wheel 820, plate 830, and fasteners 831. As illustrated, bracket 801 includes plate 802 and cradle 803. Cradle 803 may include extensions 806 extending into lug openings of wheel 820 such that wheel 820 may be arranged against bracket 801 (e.g., by lifting wheel 820 onto extensions 806). Bracket 801 may be configured to interface with any suitable wheel (e.g., a full-size spare, a donut-type spare, any other suitable spare wheel). Cradle 803 may be made of foam, rubber, plastic, metal, coated metal (e.g., coated with foam, rubber, plastic, or other suitable material), any other suitable material, or any combination thereof (e.g., a composite thereof). Plate 802 may be a metal plate, plastic plate, reinforced plate, a plate of any other suitable material, or any combination thereof. Plate 802 and cradle 803 may be affixed together to form bracket 801, or may be formed as a single part. Bracket 801 may be affixed to vehicle body 805 (e.g., arranged at a rear of the vehicle), and may be configured to accommodate wheel 820. Once wheel 820 is mounted on cradle 803 of bracket 801, plate 830 may be arranged and then fasteners 831 (e.g., lugs, bolts, machine screws, or other suitable hardware) may be installed (e.g., engaged with threaded holes 810 of bracket 801) to secure plate 830 to the vehicle (e.g., by securing against wheel 820 to bracket 801). A container may then be arranged and mounted to plate 830 using any suitable interface such as, for example, fasteners, clips, tabs, latches, any other suitable affixment, or any combination thereof.

Figure 10:
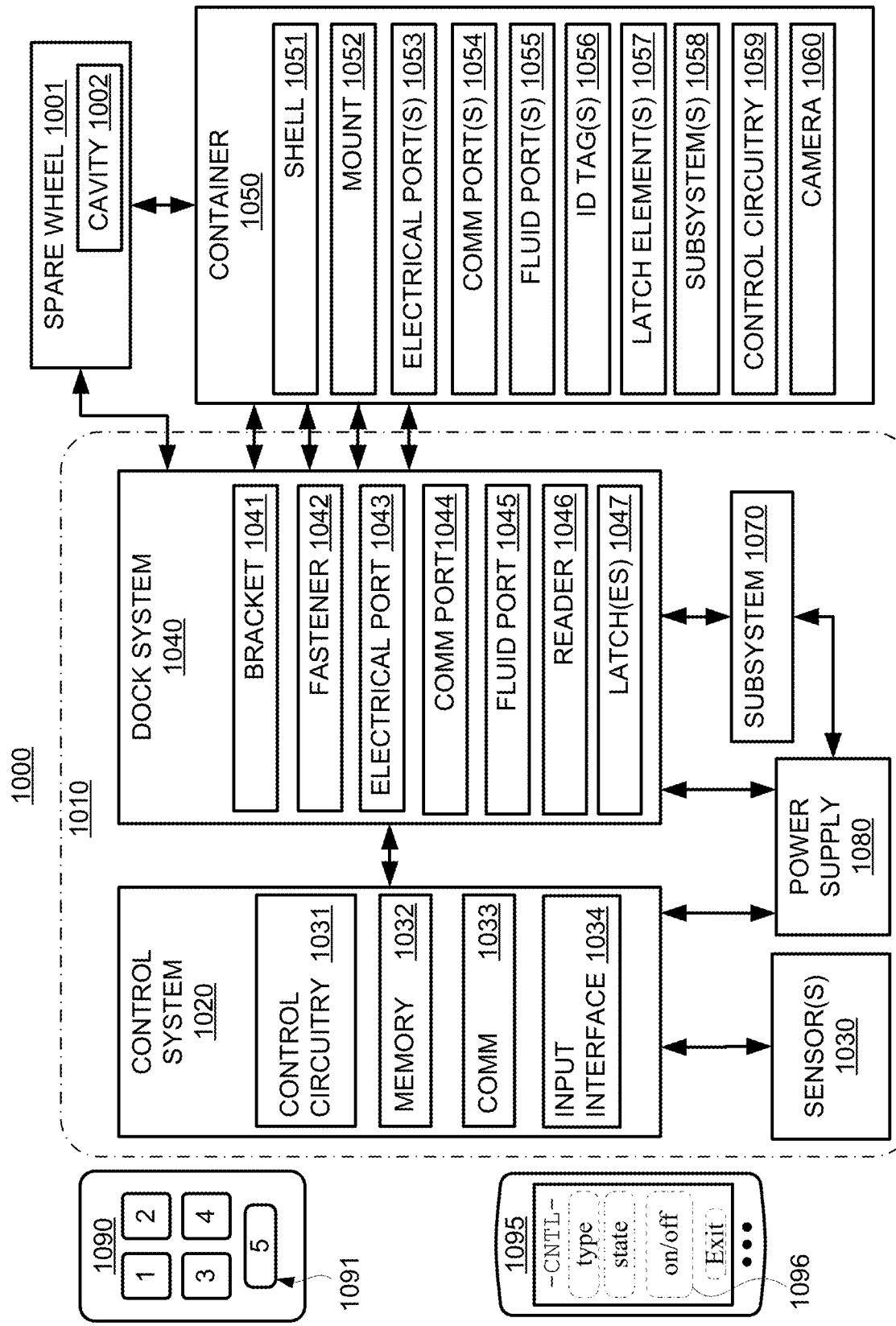
FIG. 10 is a system diagram of an illustrative vehicle having a spare wheel container, in accordance with some embodiments of the present disclosure.

FIG. 10 is a system diagram of illustrative vehicle 1010 having a spare wheel container (e.g., container 1050), in accordance with some embodiments of the present disclosure. In an illustrative example, vehicle 1010 is the same as vehicle 100 of FIG. 1, dock system 1040 may be the same as dock 110 of FIG. 1 (e.g., or otherwise share aspects with dock 110), and container 1050 may be the same as container 150 of FIG. 1. Although illustrated as separate in FIG. 10, any or all of control system 1020 and dock system 1040 may be combined or modified in accordance with the present disclosure. For example, a control system may include the functionality of dock system 1040, and container 1050 may include control circuitry. Vehicle 1010, as illustrated, includes control system 1020, dock system 1040, container 1050 (e.g., which may correspond to one or more containers), sensors 1030, power supply 1080, subsystem 1070, and spare wheel 1001. System 1000 includes vehicle 1010 as well as, in some embodiments, keyfob 1090 and user device 1095, which are configured to communicate with vehicle 1010 (e.g., control system 1020 thereof).

Control system 1020, as illustrated, includes control circuitry 1031, memory 1032, communications interface 1033 (comm 1033), and input interface 1034 (e.g., for receiving input from keyfob 1090 and/or user device 1095). Control circuitry 1031 may include a processor, a communications bus, memory, power management circuitry, a power supply, any suitable components, or any combination thereof. Memory 1032 may include solid state memory, a hard disk, removable media, any other suitable memory hardware, or any combination thereof. In some embodiments, memory 1032 is configured to store computer instructions that, when executed, perform at least some steps of process 1200 described in the context of FIG. 12.

Comm 1033 may include one or more ports, connectors, input/output (I/O) terminals, cables, wires, a printed circuit board, control circuitry, any other suitable components for communicating with other units, devices, or components, or any combination thereof. In some embodiments, control system 1020 is configured to control a drivetrain (e.g., control an engine, electric motor, transmission, brake), control or manage a battery system (e.g., power supply 1080), determine status information of the vehicle or components thereof, communicate with other units (e.g., dock system 1040), perform any other suitable actions, or any combination thereof. In some embodiments, comm 1033, input interface 1034, or both, may be configured to send and receive wireless information between control system 1020 and external devices such as, for example, network devices (e.g., a server, a WiFi access point), user device 1095 (e.g., a smart phone), keyfobs (e.g., keyfob 1090), any other suitable devices, or any combination thereof.

Control system 1020 may include an antenna and other control circuitry, or any combination thereof, and may be configured to access the internet, a local area network, a wide area network, a Bluetooth-enable device, an NFC-enabled device, any other suitable device using any suitable protocol, or any combination thereof. In some embodiments, input interface 1034 includes, for example, a screen, a touchscreen, a touch pad, a keypad, one or more hard buttons, one or more soft buttons, a microphone, a speaker, any other suitable components, or any combination thereof. For example, in some embodiments, input interface 1034 includes all or part of a dashboard, including displays, dials and gauges (e.g., actual or displayed), soft buttons, indicators, lighting, and other suitable features. In a further example, input interface 1034 may include one or more hard buttons arranged at the exterior of the vehicle (e.g., near bracket 1041), interior of the vehicle (e.g., at the dash console), or at a dedicated keypad arranged at any suitable position.

Dock system 1040, as illustrated, includes bracket 1041, fastener 1042, one or more electrical ports 1043, one or more communications (comm) ports 1044, one or more fluid ports 1045, reader 1046, and one or more latches 1047. Bracket 1041 may include one or more frame features, structural elements, joints, or a combination thereof to affix to the vehicle (e.g., a frame or body panel thereof) and to spare wheel 1001. For example, bracket 1041 may include a metal arm or frame element joined to the vehicle by a hinge, rail, linkage, or other suitable mechanism for either remaining fixed or achieving displacement along a constrained trajectory. In a further example, bracket 1041 may correspond to bracket 801 of FIG. 8. Bracket 1041 may be configured to swing out, swing down, or slide relative to the vehicle. In some embodiments, fastener 1042 is used to secure spare wheel 1001 to bracket 1041. Fastener 1042 may include a threaded fastener (e.g., a stud, bolt, machine screw, nut), a clip, a feature that engages with a mating feature of bracket 1041, or a combination thereof. In some embodiments, bracket 1041 and fastener 1042 may be integrated together (e.g., bracket 1041 may include mechanisms of fastener 1042 rather than fastener 1042 being a separate component). In an illustrative example, bracket 1041 may include bracket elements 540 and 541 of FIG. 5. Electrical port(s) 1043 may include connectors, cables, wires, input/output (I/O) terminals, a printed circuit board, control circuitry (e.g., signal conditioners, power conditioners), any other suitable components, or any combination thereof that may be electrically coupled to control system 1020. For example, electrical port(s) 1043 may include electrical connectors configured to mate with electrical connectors of container 1050. Comm port(s) 1044 may include one or more connectors, cables, wires, input/output (I/O) terminals, a printed circuit board, control circuitry, any other suitable components for communicating with other units, devices, or components, or any combination thereof. For example, comm port(s) 1044 may be configured to interface to comm 1033 of control system 1020, any other suitable device or components, or any combination thereof. In a further example, comm port(s) 1044, comm 1033, or both may be configured for near-field communications (NFC) with a user device (e.g., user device 1095), container 1050 (e.g., comm port(s) 1054 thereof), any other suitable device, or a combination thereof. Fluid port(s) 1045 may include fittings, tubing, hosing, piping, any other suitable components, or any combination thereof that may be coupled to subsystem 1070 (e.g., a fluid-based system thereof). For example, fluid port(s) 1043 may include fluid fittings configured to mate with fluid fittings of container 1050. Reader 1046 may be configured to interact with ID tags 1056 of container 1050 or otherwise determine container information about container 1050. For example, reader 1046 may include an RFID reader, a proximity sensor (e.g., to determine which containers are near), a contact sensor (e.g., to determine if container 1050 is installed), any other suitable sensor or module, or any combination thereof. Latch(es) 1047 may include one or more latches such as cinch mechanisms, clamps, locks, or a combination thereof configured to secure container 1050 to dock system 1040 (e.g., to bracket 1041 thereof), wheel 1001 to dock system 1040 (e.g., to bracket 1041 thereof), or a combination thereof. For example, latch(es) 1047 may be powered by power supply 1080 and controlled by control circuitry 1031 of control system 1020. In an illustrative example, latch(es) 1047 may include latch 542 of FIG. 5.

Container 1050, as illustrated, includes shell 1051, mount 1052 (e.g., for holding stored items), one or more electrical ports 1053 (e.g., for coupling to electrical port(s) 1043 of dock system 1040), comm port 1054 (e.g., for communicating with comm port 1044 of dock system 1040), one or more fluid ports 1055 (e.g., for interfacing with fluid port(s) 1045 of dock system 1040), one or more identification (ID) tags 1056 (e.g., configured to be read by reader 1046 of dock system 1040), one or more latch elements 1057 (e.g., for interfacing with latch 1047), one or more subsystems 1058 (e.g., or components thereof), control circuitry 1059, any other suitable components, or any suitable combination thereof (e.g., a subset of components illustrated in FIG. 10).

For example, a container may include some or all of the components illustrated as part of container 1050 in FIG. 10. In a further example, a plurality of containers for a vehicle may each include a subset of the components illustrated as part of container 1050 in FIG. 10. In some embodiments, shell 1051 includes an outer structure of container 1050. For example, shell 1051 may include a sidewall (e.g., a sheet metal wall, a plastic wall), a handle, a label, a frame, any other suitable components, or any combination thereof. In a further example, shell 1051 may approximately define the size and shape of container 1050, and accordingly, shell 1051 is configured to fit within (e.g., fully or partially) cavity 1002 of spare wheel 1001 (e.g., when mounted to dock system 1040). In a further example, shell 1051 has an outer diameter, cavity 1002 of spare wheel 1001 has an inner diameter, and the outer diameter is less than the inner diameter such that container 1050 fits within cavity 1002. In some embodiments, mount 1052 includes a region (e.g., a mounting area), a component (e.g., to mechanically interface with dock system 1040), or a combination thereof for interfacing with, and affixing to, bracket 1041, spare wheel 1001, or both. For example, mount 1052 may include fasteners, magnets, features (e.g., steps, lips, ridges, holes, recesses, bosses or extensions), any other suitable aspects, or any combination thereof. In some embodiments, shell 1051 and mount 1052 are a single component (e.g., need not be separate components or features), or otherwise integrated together. In an illustrative example, shell 1051 may include a cylindrical outer surface having one or more mounts of mount 1052 (e.g., which may be surfaces of shell 1051). In a further example, container 1050 may include an outer shell (e.g., of shell 1051) and a mounting area (e.g., of mount 1052) configured to interface to vehicle 1010.

Electrical port 1053 may include an electrical connector (e.g., a mating electrical connector configured to interface with electrical port 1043 of dock system 1040). For example, electrical port 1053 may include one or more electrical terminals, which may be coupled to control circuitry 1059, and which are configured to electrically contact electrical terminals of electrical port 1043 when container 1050 is arranged in cavity 1002 of spare wheel 1001. Comm port 1054 may be configured to communicate with comm port 1044 of dock system 1040, by sending and receiving signals (e.g., over wired or wireless communication links). For example, comm port 1054 may include one or more electrical terminals, which may be coupled to control circuitry 1059, and which are configured to electrically contact electrical terminals of comm port 1044 when container 1050 is arranged in cavity 1002 of spare wheel 1001 or otherwise nearby (e.g., if configured for wireless communication). In some embodiments, container 1050 (e.g., electrical ports 1053 thereof) includes a USB port or other suitable port for charging or powering a user device (e.g., a mobile phone, computer, light, radio). In a further example, container 1050 may include a battery (e.g., of subsystem 1058) configured to provide electrical power to an external device via electrical port 1053.

Fluid port 1055 may include a fluid connector (e.g., a mating fluid connector configured to interface with fluid port 1045 of dock system 1040). For example, fluid port 1055 may include one or more fittings (e.g., quick connect fittings, O-ring fittings, flare fittings, or any other suitable sealable interface for transferring a fluid between container 1050 and dock system 1040, when container 1050 is arranged in cavity 1002 of spare wheel 1001. For example, subsystem 1058 may be a fluid-based system (e.g., a refrigeration system, water system, vacuum system, compressed air system, or other suitable system) that may be coupled to subsystem 1070 to interact with, or otherwise form a collective system with, subsystem 1070. For example, subsystem 1070 may include a pump, compressor, pressure regulator, filter, tank, any other suitable components, or any combination thereof that may interface to container 1050 between a coupling fluid port 1045 and fluid port 1055. In some embodiments, subsystem 1058 is a fluid-based system that need only receive electrical power and optionally control signals from dock system 1040 (e.g., subsystem 1058 may be self-contained and fluid port 1055 may be fill, vent, or drain port that need not interface to fluid port 1045). Fluid port 1055, and accordingly subsystem 1058, may be configured to use any suitable fluid including, for example, air, water, coolant, refrigerant, lubricant, any other suitable fluid, or any combination thereof. In an illustrative example, container 1050 may be configured to function as a shower, and may include a water tank, a compressed air system, a heater, or a combination thereof.

In some embodiments, container 1050 includes one or more ID tags 1056, which may include radio-frequency identification (RFID) tags, memory configured to store information about container 1050, any other suitable tags, or any combination thereof. For example, ID tags 1056 may include an RFID tag that is readable by reader 1046 (e.g., which may generate a signal to which the RFID tag responds). In a further example, ID tags 1056 may include solid state memory coupled to, or included as part of, control circuitry 1059. When container 1050 is docked, or otherwise affixed to dock system 1040, information of ID tags 1056, control circuitry 1059, or a combination thereof may be accessible to control circuitry 1031 (e.g., via electrical ports 1043 and 1053). In an illustrative example, in some embodiments, container 1050 includes an identifier tag (e.g., of identifier tags 1056), and control circuitry 1031 is configured to identify the identifier tag, and determine information about container 1050 based on the identifier tag. In some embodiments, control circuitry 1031 is configured to communicate with container 1050, and the information about container 1050 includes a filled level of container 1050 (e.g., a liquid level, an amount of solids or items, a pressure of a gas, or other suitable indicator of a level or an amount of something in container 1050).

In some embodiments, latch element(s) 1057 are configured to interface with latch(es) 1047 of dock system 1040. For example, latch element(s) 1057 may include pins, loops, hooks, knobs, recesses (e.g., holes), bosses (e.g., extensions), any other suitable features, or any combination thereof that may be secured and released by a latch of latch(es) 1047.

In some embodiments, subsystem 1058 and subsystem 1070 collectively form a subsystem. In some embodiments, subsystem 1070 is a standalone system, and subsystem 1058 may append the functionality or capacity of subsystem 1070 when container 1050 is coupled to dock system 1040. Subsystem 1058 may include, for example, a refrigerator, auxiliary battery, vacuum cannister, compressed air system, electric grill, any other suitable system, or any combination thereof that may interface to dock system 1040 using electrical port(s) 1053, comm port(s) 1054, fluid port(s) 1055, or a combination thereof. In some embodiments, container 1050 may be configured as storage, a toolbox, a waste can, a container (e.g., for items or a fluid), a first aid kit, or otherwise need not include electrical port(s) 1053, comm port(s) 1054, fluid port(s) 1055, subsystem 1058, control circuitry 1059, or ID tags 1056. In some embodiments, control circuitry 1059 is configured to monitor and control subsystem 1058. For example, dock system 1040 may be configured to provide electrical power to container 1050 (e.g., subsystem 1058 and/or control circuitry 1059 thereof) via connection of electrical port(s) 1043 and 1053. In a further example, subsystem 1058 may include a refrigerator, auxiliary battery, vacuum cannister, compressed air system, or any other suitable system that may exchange electrical power with dock system 1040 (e.g., which may transfer power to and from power supply 1080). For example, subsystem 1058 may include a fluid system (e.g., vacuum-based, gas-based, liquid based), and may be coupled to dock system 1040 (e.g., and control circuitry 1020) by at least one electrical connector of electrical ports 1053 configured to engage with at least one electrical connector of electrical ports 1043. In some embodiments, subsystem 1058 includes a display system (e.g., a touchscreen, a screen) configured to generate a display, receive input (e.g., to a touchscreen), or both. In some embodiments, subsystem 1058 includes a keypad, one or more hard buttons, one or more soft buttons, any other suitable selectable features, or a combination thereof with which the user may interact.

In some embodiments, container 1050 may include camera 1060 configured to capture images, video, audio, or a combination thereof. For example, control circuitry 1059 may be configured to store image files, video files, or audio files in memory, and transmit the files to control system 1020 via electrical ports 1043 and 1053, comm ports 1044 and 1054, or a combination thereof. In a further example, input interface 1034 may include interface 711 of FIG. 7, which may be configured to display images, videos, or audio as generated by camera 1060 and processed by control circuitry 1059. In some embodiments, a camera system (e.g., camera 1060 and suitable aspects of control circuitry 1059) is configured to capture images or video from camera 1060, which may be directed at the contents of the bin (e.g., container 1050). For example, the video or images may be displayed on a center information display (CID) such as interface 711. In some embodiments, camera 1060 may be directed outwards and may, for example, provide a rearward view from the vehicle (e.g., a rear camera for parking or other visualizations).

Power supply 1080 may include, for example, a vehicle battery pack that may include a plurality of battery cells. For example, power supply 1080 may include battery cells, busbars, current collectors, enclosures, DC bus cables or otherwise conductors, contactors, switches, sensors and instrumentation, any other suitable components, or any combination thereof. In some embodiments, container 1050 is configured as a battery system (e.g., a backup battery system or auxiliary battery system), and subsystem 1058 may include one or more battery cells, power electronics, circuitry (e.g., of, or coupled to, control circuitry 1059), or any combination thereof. In some embodiments, subsystem 1058 includes an electric cord wound on a reel that may be coupled to power supply 1080 via coupling of electrical ports 1043 and 1053. For example, the length of electric cord may be wound around a spool having a cylinder shape corresponding to shell 1051 that is configured to fit within cavity 1002 of spare wheel 1001.

Keyfob 1090, as illustrated, includes five buttons 1091 (e.g., labeled as 1-5 for illustrative purposes). Each of buttons 1091 may correspond to a particular function associated with the vehicle. When any of buttons 1091 is pressed, control circuitry of keyfob 1090 may receive a signal that corresponds to the button press (e.g., from an electrical switch or sensor coupled to the button) and generate a message or otherwise a signal for transmitting to comm 1033 or comm 1044. To illustrate, one or more of buttons 1091 may correspond to a "lock" command, a "release" command, an "ON" or "OFF" command, an operating command, or a combination thereof for controlling container 1050 (e.g., for achieving a state of container 1050). User device 1095 may include a smart phone, laptop, tablet, computer, any other suitable mobile or user device, or any combination thereof. As illustrated, user device 1095 includes four soft buttons 1096, each corresponding to a particular function associated with container 1050. When any of soft buttons 1096 is selected, control circuitry of user device 1095 may receive a signal that corresponds to the button press (e.g., from an electrical switch or sensor coupled to the button), and in response generate a message or otherwise signal for transmitting to a communications interface of vehicle 1010 (e.g., comm port 1033 or comm port 1044). In an illustrative example, the user may select an application implemented on user device 1095 to control aspects of or operation of container 1050. As illustrated, soft buttons 1096 include a "type" button (e.g., to identify a type of container 1050 installed or in proximity), a "state" button (e.g., to identify or control a state of container 1050, such as "lock/unlock"), a "on/off" button to activate some function or operation of container 1050, to provide respective commands to control system 1020.

In an illustrative example, dock system 1040 (e.g., a dock) may be configured to secure a spare wheel 1001 to an exterior surface of vehicle 1010 with an outer face of spare wheel 1001 facing inwards toward vehicle 1010 and a cavity of spare wheel 1001 facing outwards away from vehicle 1010. Container 1050 may be configured to be arranged in the cavity of spare wheel 1001.

In a further illustrative example, container 1050 includes an electrical connector of electrical port(s) 1053, and dock system 1040 includes a mating electrical connector of electrical port(s) 1043 that is configured to interface to the electrical connector when container 1050 is arranged in cavity 1002 of spare wheel 1001. In some embodiments, dock system 1040 or control system 1020 is configured to provide electrical power to the container 1050, a control signal to container 1050, or both (e.g., via contact of electrical ports 1043 and 1053).

In a further illustrative example, container 1050 includes at least one first communications port (e.g., of comm ports 1054) configured to communicate with control circuitry 1031 of vehicle 1010 (e.g., via comm port 1044 of dock system 1040).

In a further illustrative example, container 1050 includes at least one fluid port of fluid port(s) 1055, and dock system 1040 includes at least one mating fluid port of fluid port(s) 1045 that is configured to interface to the at least one fluid port when container 1050 is arranged in cavity 1002 of spare wheel 1001 such that a fluid may transfer between the at least one fluid port and the at least one mating fluid port.

In a further illustrative example, container 1050 includes an identifier tag of ID tag 1056, and control circuitry 1031, reader 1046, or a combination thereof is configured to identify the identifier tag, and to determine information about container based on the identifier tag (e.g., which type of container 1050 is installed or in proximity).

In an illustrative example, element 340 of FIG. 3 may be an example of bracket 1041, and container 330 may be an example of container 1050. In a further illustrative example, containers 430-432 of FIG. 4 may each be an example of container 1050 (e.g., wherein shell 1051 is roughly cylindrical).

In an illustrative example, container 1050 may be a water container. For example, shell 1051 may be a cylindrical shell with a hollow interior for storing water. In a further example, the water container may include a fill/drain port of fluid ports 1055. In a further example, subsystem 1058 may include a water pump, filter, nozzle, heater (e.g., for a shower), any other suitable components, or any combination thereof for managing water storage, flow, and dispensing. In some embodiments, a water container may include one or more electrical ports 1053 (e.g., in the form of an electrical connector with electrical terminals) for providing electrical power to container 1050 from mating electrical ports 1043 (e.g., to power pumps, heaters, or other electrical components).

In an illustrative example, container 1050 may be a refrigerator or cooler. In some embodiments, shell 1051 may include thermal insulation such as foam, vacuum chambers, or any other suitable insulation type for limiting heat transfer to and from the storage space of container 1050. In some embodiments, subsystem 1058 includes a refrigeration system (e.g., refrigerant-based, thermoelectric, or any other suitable cooling system). For example, control circuitry 1059 may include one or more temperature sensors for maintaining a temperature of a cooled space of container 1050. In a further example, a cooler may include one or more electrical ports 1053 (e.g., in the form of an electrical connector with electrical terminals) for providing electrical power to container 1050 from mating electrical ports 1043 (e.g., to power pumps, compressors, thermoelectric circuits, or other electrical components).

In an illustrative example, container 1050 may be an auxiliary battery. In some embodiments, subsystem 1058 includes a plurality of battery cells, busbars and current collectors, sensors (e.g., current sensors, voltage sensors, temperature sensors), and power electronics, which may be coupled to DC-bus connectors of electrical ports 1053. The DC-bus connectors may be configured to engage with DC-bus connectors of electrical ports 1043, which may be coupled to power supply 1080 (e.g., a main battery pack).

In an illustrative example, container 1050 may be a vacuum cannister. Shell 1051 may include an evacuated space (e.g., partially evacuated to a pressure less than 1 atm) or a space configured to be evacuated. Subsystem 1058 may include a vacuum pump, of any suitable type, for reducing the pressure in shell 1051, to be used for cleaning (e.g., vacuuming), providing suction (e.g., for siphoning or fluid transfer), or any other suitable purpose. In a further example, a vacuum cannister may include one or more electrical ports 1053 (e.g., in the form of an electrical connector with electrical terminals) for providing electrical power to container 1050 from mating electrical ports 1043 (e.g., to power a vacuum pump, or other electrical components). Shell 1051 may be configured to be put under vacuum and may be configured to store debris from vacuum cleaning. Subsystem 1058 may include a vacuum hose and attachments, and control circuitry 1059 may include an on/off switch.

In an illustrative example, container 1050 may be a compressed air system. Shell 1051 may include a pressurized space (e.g., partially pressurized to a pressure greater than 1 atm) or a space configured to be pressurized. Subsystem 1058 may include a compressor, of any suitable type, for increasing the pressure in shell 1051, to be used for cleaning (e.g., blowing compressed air), providing pressurized air (e.g., for air-powered tools), or any other suitable purpose. In a further example, a compressed air system may include one or more electrical ports 1053 (e.g., in the form of an electrical connector with electrical terminals) for providing electrical power to container 1050 from mating electrical ports 1043 (e.g., to power a compressor, or other electrical components). Subsystem 1058 may include a hose and attachments, and control circuitry 1059 may include an on/off switch.

In an illustrative example, container 1050 may be an electric grill. In some embodiments, the electric grill need not be used when stowed in cavity 1002 but is rather only stored for later use. Accordingly, container 1050 may have functionality when not arranged in cavity 1002, and accordingly may be stored when not in use in cavity 1002.

In an illustrative example, container 1050 may be an electric cord wound on a reel. In some embodiments, subsystem 1058 includes an electric cord wound on a reel that may be extended and retracted. The cord may be coupled to electrical ports 1053, which may include one or more connectors that may be coupled to mating connectors of electrical ports 1043.

Figure 11:
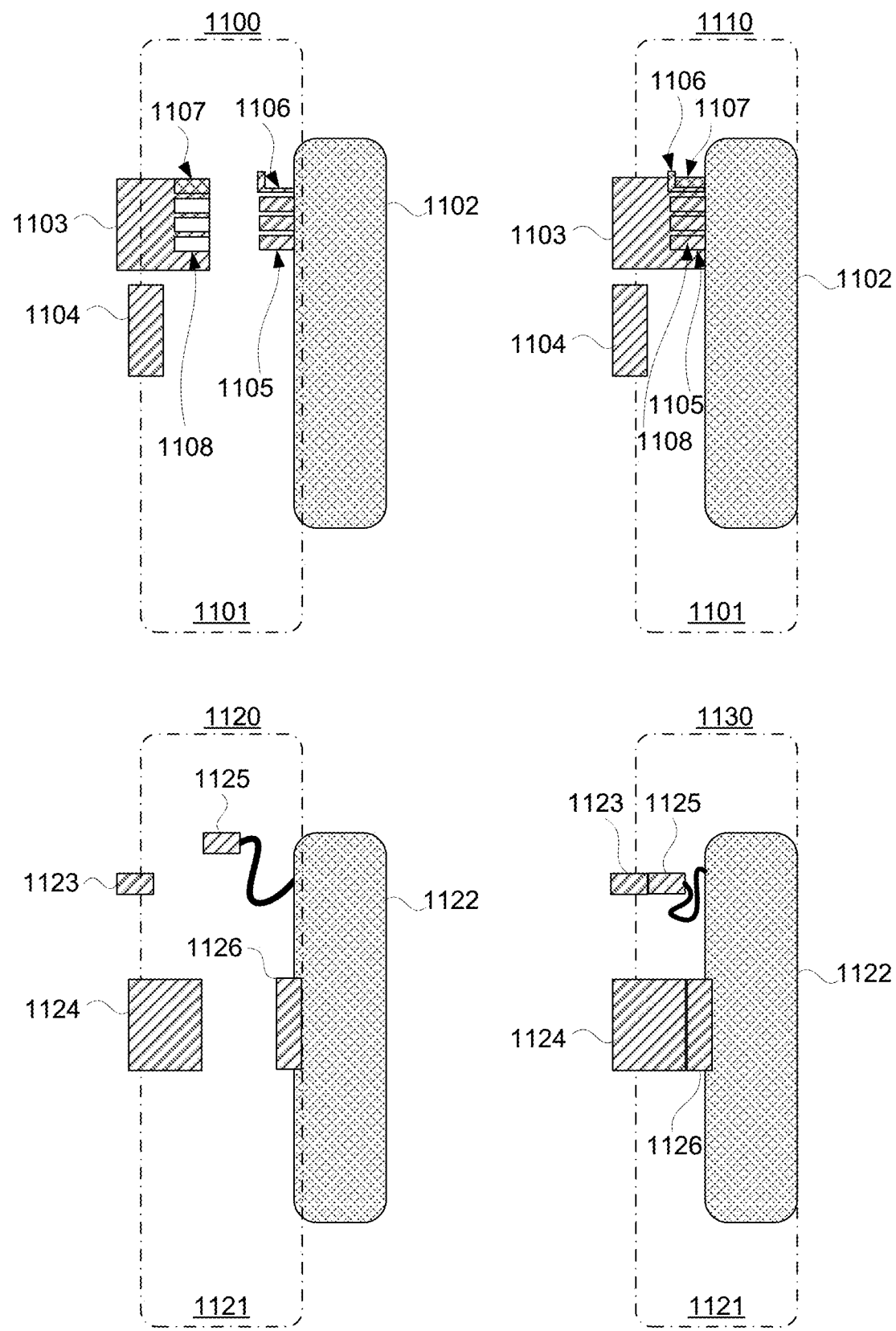
FIG. 11 is a block diagram of several illustrative docks and containers, in accordance with some embodiments of the present disclosure.

FIG. 11 is a block diagram of several illustrative docks and containers, in accordance with some embodiments of the present disclosure. Panels 1100 and 1110 show examples of a free and stowed container (e.g., container 1102). To illustrate, the illustrative docks and containers of FIG. 11 may correspond to dock system 1040 and container 1050 of FIG. 10, respectively.

As illustrated in panels 1100 and 1110, wheel 1101 is secured to hub 1104. Dock 1103, which may include hub 1104 (e.g., hub 1104 may be a bracket of bracket 1041), includes latch 1107 (e.g., of latch(es) 1047) and three ports 1108 (e.g., three connectors, although any suitable number of ports or connects may be included), as illustrated. Ports 1108 may include electrical ports 1043, fluid ports 1045, comm ports 1044, reader 1046, or any combination thereof. In some embodiments, dock 1103 is arranged radially offset from hub 1104 such that dock 1103 aligns with an opening in wheel 1101 (e.g., a hole or opening in the rim of wheel 1101 radially outward of the wheel hub). Container 1102 includes pin 1106 (e.g., of latch elements 1057) configured to engage with latch 1107 and three ports 1105 (e.g., three connectors, although any suitable number of ports or connects may be included) configured to couple to ports 1108, as illustrated. Ports 1105 may include electrical ports 1053, fluid ports 1055, comm ports 1054, ID tags 1056, or any combination thereof that are configured to mate with, or otherwise interface with, ports of ports 1108. To illustrate, wheel 1101 may be secured to hub 1104 with a cavity of wheel 1101 facing outwards, and container 1102 may be arranged in the cavity to interface with dock 1103. When container 1102 is secured to dock 1103, ports 1105 are coupled to ports 1108, and pin 1106 is engaged by latch 1107. Although illustrated as separate components for purposes of clarity, hub 1104 and dock 1103 may be a single component or system, or otherwise dock 1103 may include hub 1104. Accordingly, a vehicle may include one or more docks, which may include one or more hubs, for mounting a wheel and a container. The region of container 1102 corresponding to ports 1105 and pin 1106 is a mounting area (e.g., of mount 1052).

As illustrated in panels 1120 and 1130, wheel 1121 is secured to hub 1124 (e.g., bracket 1041). Connector 1123 and hub 1124 may collectively be referred to as a dock. Connector 1123 may include electrical ports 1043, fluid ports 1045, comm ports 1044, reader 1046, or any combination thereof. Connector 1123 may be arranged radially offset from hub 1124 such that dock 1103 aligns with an opening in wheel 1101, or may be arranged as part of hub 1124. Container 1122 includes connector 1125 configured to couple to connector 1123, as illustrated in panel 1130. Connector 1123 may include electrical ports 1053, fluid ports 1055, comm ports 1054, ID tags 1056, or any combination thereof that are configured to mate with, or otherwise interface with, connector 1123. To illustrate, wheel 1121 may be secured to hub 1124 with a cavity of wheel 1121 facing outwards, and container 1122 may be arranged in the cavity. Connectors 1123 and 1125 may be coupled together before, during, or after container 1122 is arranged in the cavity, depending on the location/accessibility of connector 1123 and the user's preference (e.g., the arranging and coupling may occur simultaneously or sequentially). As illustrated, container 1122 may be secured to hub 1124 (e.g., using a latch, fastener, or any other suitable affixment). Although illustrated as separate components for purposes of clarity, hub 1124 and connector 1123 may be a single component or system, or otherwise hub 1124 may include connector 1123 (e.g., collectively a dock).

Figure 12:
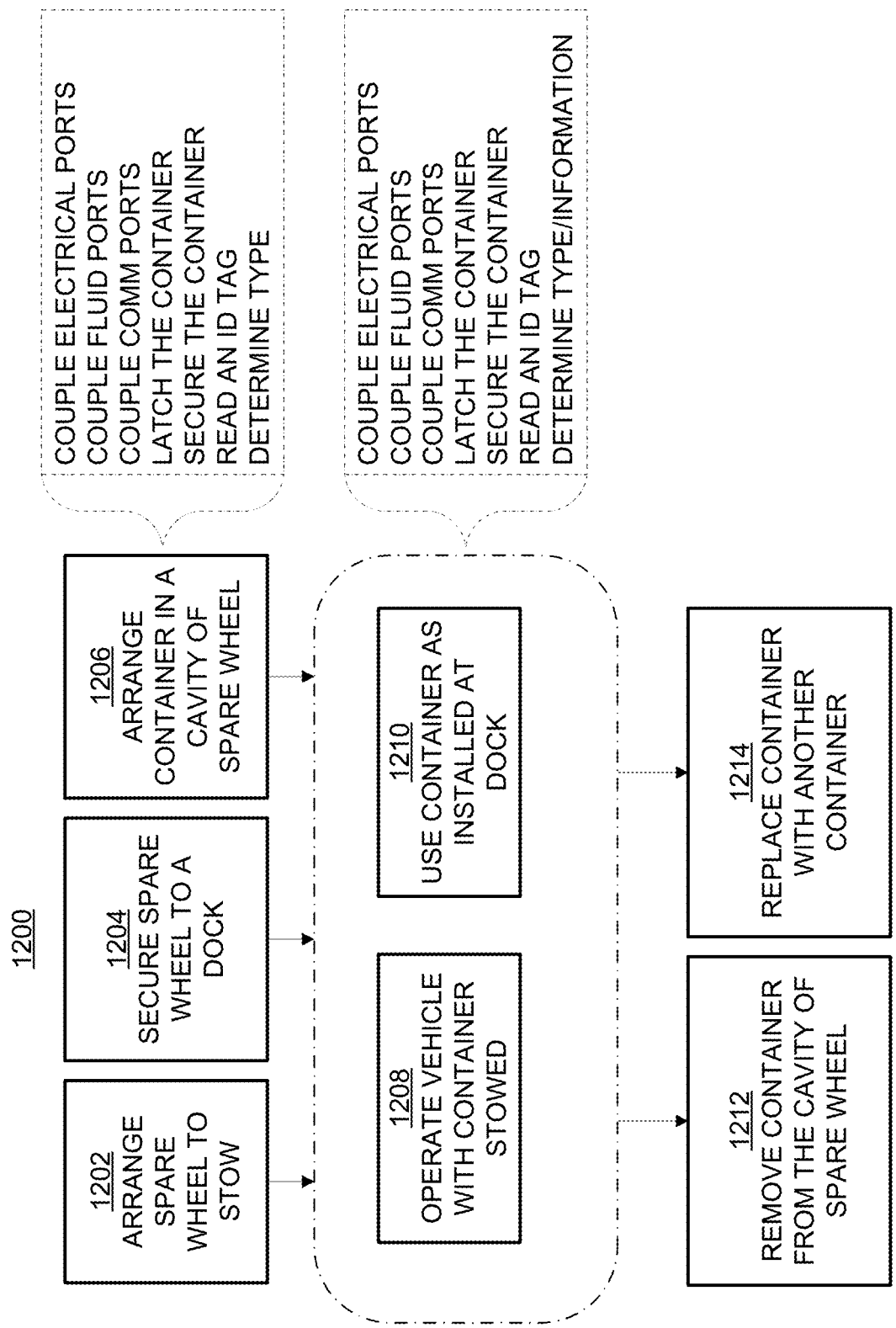
FIG. 12 is a flowchart of an illustrative process for managing a container, in accordance with some embodiments of the present disclosure.

FIG. 12 is a flowchart of illustrative process 1200 for managing a container, in accordance with some embodiments of the present disclosure. For example, process 1200 may be used to manage container 1050 of FIG. 10.

Step 1202 includes arranging a spare wheel at the exterior of a vehicle. In some embodiments, a user places the spare wheel at a bracket arranged on the exterior of the vehicle. For example, the bracket may be arranged at a hatch door or gate at the rear of the vehicle. The user may lift the spare tire onto the bracket, with the outer side of the wheel facing inwards towards the vehicle. The inner side of the spare wheel (e.g., that faces inward when the wheel is installed as a driving wheel engaged with the ground) faces outward away from the vehicle. Step 1202 may include arranging any suitable wheel at the exterior of the vehicle including, for example, a full size spare, a limited operation spare (e.g., a "donut" spare), a wheel that has been replaced or otherwise removed from a drive axis, or any other suitable wheel.

Step 1204 includes securing the spare wheel to a dock (e.g., a bracket thereof). In some embodiments, steps 1202 and 1204 may be combined, and the spare wheel may be arranged and secured as a single process. For example, arranging the spare wheel in place may include engaging a latch mechanism that secures the spare wheel. In some embodiments, step 1204 includes engaging one or more fasteners such as, for example, a threaded nut, a bolt or screw, a threaded stud, a clip, a clasp, or any other suitable fastener. In some embodiments, step 1204 includes engaging a latch mechanism (e.g., formed by latch(es) 1047). For example, the latch mechanism may include a cinching mechanism or other suitable mechanism for positioning, securing, or otherwise constraining the spare wheel from moving relative to the bracket. In some embodiments, the spare wheel is secured by an automatic latch of latch(es) 1047, which may be controlled by user device 1095, keyfob 1090, input interface 1034, or any combination thereof.

Step 1206 includes arranging a container in the cavity of the spare wheel. Because the cavity faces outward away from the vehicle (e.g., as arranged at step 1202), the user can access the cavity and more easily place the container at step 1206. In some embodiments, the user places the container into the cavity and secures the container to the spare wheel, the bracket, or a combination thereof. In some embodiments, there may be a plurality of containers for the vehicle, and step 1206 includes selecting one container and arranging it in the spare wheel. In some embodiments, a container may include a semicircular shape (e.g., such that two containers may be arranged in the cavity at the same time), or any other suitable shape that is sized to fit within the cavity of the spare wheel. In some embodiments, step 1206 includes engaging one or more fasteners such as, for example, a threaded nut, a bolt or screw, a threaded stud, a clip, a clasp, or any other suitable fastener. In some embodiments, step 1206 includes engaging a latch mechanism (e.g., formed by latch(es) 1047 and latch element(s) 1057 of container 1050). For example, the latch mechanism may include a cinching mechanism or other suitable mechanism for positioning, securing, or otherwise constraining the container from moving relative to the bracket, the spare wheel, or both. In some embodiments, the container is secured by an automatic latch of latch(es) 1047, which may be controlled by user device 1095, keyfob 1090, input interface 1034, or any combination thereof. Step 1206 may include, for example, coupling one or more of electrical ports 1053 to one or more of electrical ports 1043, coupling one or more of fluid ports 1055 to one or more of fluid ports 1045, engaging one or more of latches 1047 to one or more latch elements 1057, sending and receiving signals between comm port 1054 and comm port 1044, reader 1046 reading one or more of ID tags 1056, engaging mount 1052 to bracket 1041 (e.g., using fastener 1042), or a combination thereof. In an illustrative example, step 1206 may include installing the container in the cavity by arranging the container in the cavity and coupling one or more ports, which may occur simultaneously or sequentially.

Step 1208 includes operating the vehicle with the container stowed. For example, step 1208 may include driving the vehicle, parking the vehicle, or otherwise using the vehicle as normal with the container stowed in the cavity of the spare wheel. Because the spare wheel and container are arranged and secured to the vehicle at steps 1202, 1204, and 1206, the vehicle can be operated as normal.

Step 1210 includes using the container as installed at the dock. Because the container is arranged and secured to the vehicle, the container may be used as installed. For example, if the container is configured for storage (e.g., a waste can, toolbox, first aid kit, a canteen or water tank), the user may access the storage while the container is installed. In some embodiments, the container may include one or more of subsystems of subsystem 1058, which may be used while container 1050 is installed in the cavity. For example, the container may include a first aid kit (e.g., the user may access items stored therein), waste can (e.g., the user may discard items therein), water container (e.g., the user may fill or drain water), refrigerator (e.g., the user may access items stored therein), auxiliary battery (e.g., the user may use the battery to power accessories or increase capacity of the vehicle), vacuum cannister (e.g., the user may use the vacuum to clean or provide suction), compressed air system (e.g., the user may apply compressed air for cleaning, tools, or other uses), electric cord wound on a reel (e.g., the user may unwind the cord to power remote accessories), any other suitable container types, or any combination thereof.

Step 1212 includes removing the container from the cavity of the spare wheel. In some embodiments, step 1212 is the reverse of step 1206. For example, step 1206 may include placing the container along a first path in a first trajectory, and step 1212 may include moving the container along the first path in a reversed trajectory. To illustrate, step 1206 may include pushing the container horizontally into the cavity (e.g., towards the vehicle), while step 1212 may include pulling the container horizontally out of the cavity (e.g., away from the vehicle). In some circumstances, the user may remove the container to access the spare wheel (e.g., when changing a flat tire). In some embodiments, the user may remove the container from the cavity, but the container may still be used after removal. For example, the container may be used for storage even when removed. In a further example, if the electrical ports 1053 or fluid ports 1055 allow a coupling to be maintained even when the container is removed (e.g., via cords, hoses, or other elements that are flexible and have some length), the user may continue to use the container. In a further example, comm port 1054 may allow the container to be removed and be arranged distal to the bracket or vehicle (e.g., to at least some extent) but still be in communication with comm port 1044 of dock system 1040 or comm 1033 of control system 1020.

Step 1214 includes replacing the container with another container. In some embodiments, a plurality of containers are configured to be arranged in the cavity of the spare wheel. Each container of the plurality of containers may have the same functionality, different functionality, or some overlapping functionality as compared to the other containers. Step 1214 may include removing a first container (e.g., the container arranged at step 1206), and then performing step 1206 with a second container. The second container may be the same type as the first container (e.g., another water tank), or a different type than the first container.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system to provide storage in a vehicle, the system comprising:
    a dock to secure a wheel to an exterior surface of the vehicle with an outer face of the wheel facing inwards toward the vehicle and a cavity of the wheel facing outwards away from the vehicle;
    a first container comprising a first container type having a first type of controllable operation, and a first identifier indicating the first container type, wherein:
        the first container fits in the cavity of the wheel, and
        the wheel is configured to receive a second container in the cavity, the second container comprising a second container type having a second type of controllable operation and a second identifier, wherein:
            the second container type is different from the first container type; and
            the second type of controllable operation is different from any controllable type of operation of the first container; and
    control circuitry configured to:
        identify the controllable operation of the first container based on the first identifier;
        provide a control signal to control the controllable operation of the first container;
        identify the controllable operation of the second container based on the second identifier; and
        provide a control signal to control the controllable operation of the second container.

2. The system of claim 1, wherein the control circuitry is further configured to:
    communicate with the first container; and
    determine information about the first container based on the first identifier, wherein the information about the first container comprises a filled level of the first container.

3. The system of claim 1, wherein the control circuitry is further configured to:
    determine information about the first container based on the first identifier; and
    display the information about the first container on a display of the vehicle.

4. The system of claim 1, wherein the first container comprises at least one communications port configured to communicate with control circuitry of the vehicle.

5. The system of claim 1, wherein:
    the first container comprises at least one fluid port; and
    the dock comprises at least one mating fluid port configured to interface to the at least one fluid port when the first container is arranged in the cavity of the wheel such that a fluid may transfer between the at least one fluid port and the at least one mating fluid port.

6. The system of claim 1, wherein the first container comprises a cooler, and wherein the container is thermally insulated.

7. The system of claim 1, wherein the first container comprises an outer diameter, wherein the cavity comprises an inner diameter, and wherein the outer diameter is less than the inner diameter such that the first container fits within the cavity.

8. The system of claim 1, wherein the first container comprises a port configured to interface with a user device and is accessible when the first container is arranged in the cavity.

9. The system of claim 1, wherein the first identifier comprises a radio-frequency identification tag or memory configured to store information about the first container.

10. The system of claim 1, further comprising the control circuitry further configured to generate for display, an interface to control the controllable operation of the first container.

11. The system of claim 1, wherein:
    the first container comprises an electrical connector; and
    the dock comprises a mating electrical connector configured to interface to the electrical connector when the first container is arranged in the cavity of the wheel.

12. The system of claim 11, wherein the first container comprises an auxiliary battery coupled to the electrical connector.

13. The system of claim 11, wherein the first container comprises a fluid system coupled to the electrical connector.

14. The system of claim 11, wherein the first container comprises an electric cord wound on a reel, and wherein the electric cord is coupled to the electrical connector.

15. The system of claim 11, wherein the control circuitry is further configured to provide electrical power to the first container.

16. A method of vehicle storage comprising:
    securing a spare wheel to a bracket arranged at a rear of a vehicle with an outer face of the spare wheel arranged facing inwards toward the vehicle and a cavity of the spare wheel arranged facing outwards away from the vehicle;
    installing a first container in the cavity of the secured spare wheel such that the first container is accessible from the rear of the vehicle, wherein:
        the first container comprises a first identifier indicating a first container type having a first type of controllable operation;

installing the first container comprises:
- arranging the first container in the cavity, and
- coupling at least one port of the first container to at least one mating port of the vehicle; and the spare wheel is configured to receive a second container in the cavity, the second container comprising a second identifier indicating a second container type having a second type of controllable operation, wherein:
- the second container type is different from the first container type; and
- the second type of controllable operation is different from any controllable type of operation of the first container;

identifying, using control circuitry, the controllable operation of the first container based on the first identifier; and providing, using the control circuitry, a control signal to control the controllable operation of the first container, wherein the control circuitry is configured to:
- identify, using the control circuitry, the controllable operation of the second container based on the second identifier; and
- provide, using the control circuitry, a control signal to control the controllable operation of the second container.

17. The method of claim 16, further comprising:
determining information about the first container based on the first identifier.

18. The method of claim 16, further comprising generating, using the control circuitry, for display, an interface to control the controllable operation of the first container.

\* \* \* \* \*